Feb. 2, 1960

R. R. ROBERTS 2,923,210

PLANER FEED MECHANISM

Filed Oct. 15, 1954

INVENTOR.
ROLAND R. ROBERTS
BY
ATTORNEY

Feb. 2, 1960     R. R. ROBERTS     2,923,210
PLANER FEED MECHANISM
Filed Oct. 15, 1954     3 Sheets-Sheet 2
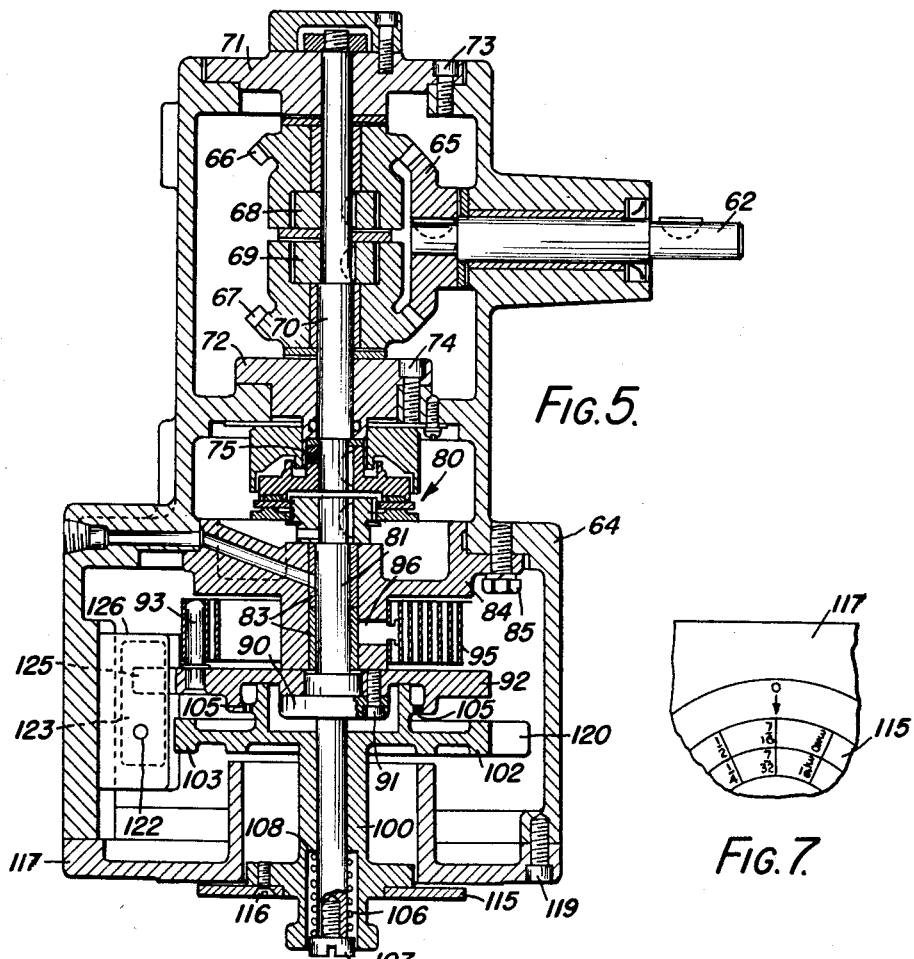
FIG. 5.
FIG. 7.
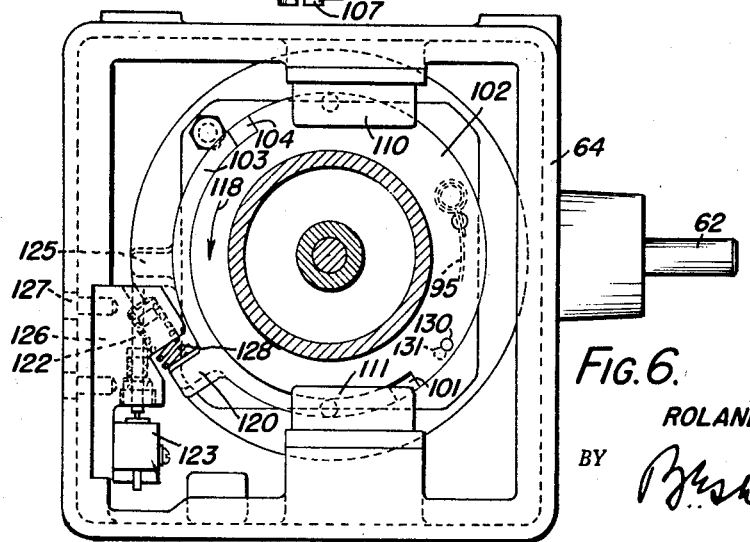
FIG. 6.
INVENTOR.
ROLAND R. ROBERTS
BY
ATTORNEY Feb. 2, 1960  R. R. ROBERTS  2,923,210
PLANER FEED MECHANISM
Filed Oct. 15, 1954  3 Sheets-Sheet 3

INVENTOR.
ROLAND R. ROBERTS
BY
Attorney

United States Patent Office 2,923,210
Patented Feb. 2, 1960

2,923,210

PLANER FEED MECHANISM

Roland R. Roberts, Irondequoit, N.Y., assignor, by mesne assignments, to Farrel-Birmingham Company, Incorporated, Ansonia, Conn., a corporation of Connecticut Application October 15, 1954, Serial No. 462,479

5 Claims. (Cl. 90—49)

The present invention relates to machine tools and more particularly to planers.

In a planer, the work is reciprocated relative to the tool, and the tool is fed relative to the work between cuts, so that on the ensuing cutting stroke more stock will be removed from the work. Usually the work is mounted on a reciprocating carriage which travels back and forth in a horizontal plane under the tool. The tool is usually in cutting position on stroke of the carriage in one direction, and is clapped out of cutting position on the return stroke of the carriage, although in some instances, the tool may be constructed to cut on the strokes of the carriage in both directions. The length of stroke of the carriage is determined by the setting of trip dogs which control the reversal of the carriage at opposite ends of its stroke. Between cutting strokes of the carriage the tool is fed relative to the work. Tool feed may be depthwise, or lateral. The amount of depthwise feed controls the thickness of chip removed from the work on the ensuing working stroke of the carriage. The lateral feed enables the tool to cut in a different path on the ensuing working stroke, and makes it possible to cover the full surface of the work which is to be planed and to plane the sides of the work.

Large planers are made thirty feet or more in length. In these big machines the carriage has great weight. It is impossible, therefore, to stop the carriage instantaneously. Therefore, it is the practice to have the carriage overtravel at both ends of its stroke. The amount of overtravel varies, of course, with the length of the work and the speed of movement of the carriage. Since the amount of overtravel varies, and since the amount of feed required varies for different types of work, it is necessary to effect for different jobs different numbers of revolutions of the motor which drives the feed mechanism between successive strokes of the carriage, in order to secure the required amount of feed in the time interval allowed by the overtravel of the carriage. If a considerable amount of feed is desired between successive strokes of the carriage, obviously the feed drive motor must make more revolutions, all things else being equal, than where a relatively slight amount of feed is needed between successive strokes.

A primary object of the present invention is to provide in a machine tool, and especially in a planer, means for controlling the number of revolutions which the feed drive motor makes during a feed cycle.

Another object of the invention is to provide a feed control mechanism of the character described which is adjustable for varying amounts of feed.

A further object of the invention is to provide a feed control mechanism of the character described which may be used with a variable speed motor, and which will be effective, whether the motor be driven at high or low speed, to control the period that the motor is in operation in a feed cycle.

Another object of the invention is to provide a feed control mechanism of the character described which may be used to control selectively both the lateral and the depthwise feed.

Another object of the invention is to provide a feed control mechanism of the character described which will operate in one direction regardless of the direction of rotation of the drive motor for the feed mechanism.

Other objects of the invention will be apparent hereinafter from the specification and from the recital of the appended claims.

In the drawings:

Fig. 5 is a section taken on the line 5—5 of Fig. 4 looking in the direction of the arrows;

Fig. 6 is a section on the line 6—6 of Fig. 4 looking in the direction of the arrows;

Fig. 7 is a fragmentary end view of the setting dial of the feed control mechanism;

Figure 1:
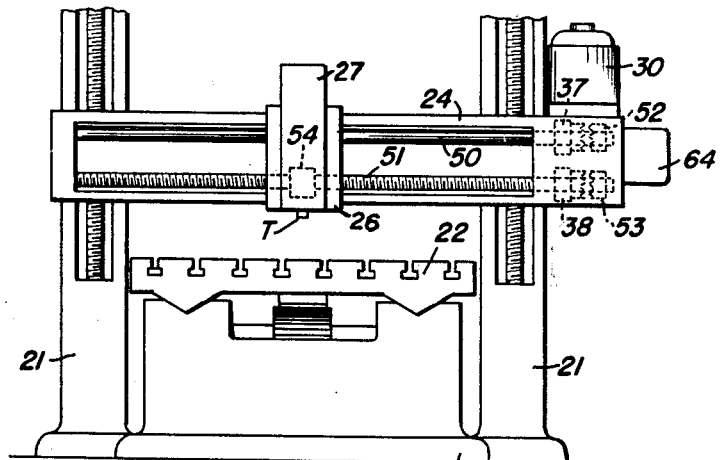
Fig. 1 is an end view of a planer in which the control mechanism of the present invention has been incorporated.

The machine, other than for the feed control mechanism, may be of conventional construction. It may comprise a base 20 having uprights or pedestals 21 secured thereto, and a work carriage 22 reciprocable thereon. Mounted on the pedestal 21 above the carriage 22 and bridging the space between the pedestals is a cross rail 24, which may carry one or more saddles 26, on each of which there is reciprocable a tool slide 27. Each tool slide or ram 27 carries a planing tool T. All this is conventional construction and has not been illustrated in detail.

Movement of the carriage may be effected hydraulically, pneumatically, or mechanically. In its movement, as in conventional practice, the carriage is adapted to trip the dogs which control the reversal of the carriage at opposite ends of its stroke. In the case of a hydraulically or pneumatically actuated carriage the trip dogs control the reverse valves that in turn control the direction of flow of the motive fluid to opposite ends of the cylinder in which the piston that actuates the carriage reciprocates. The trip dogs are, of course, adjustable toward and from one another to control the length of stroke of the carriage.

As previously stated, between strokes of the carriage in opposite directions the tool, or tools, are fed relative to the work.

Figure 2:
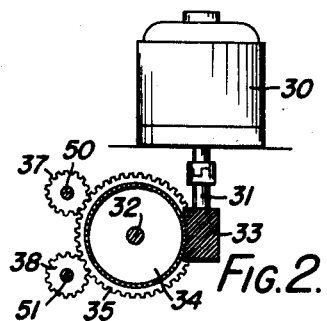
Fig. 2 is a fragmentary, more or less diagrammatic, view showing details of the feed drive of this machine.
Figure 3:
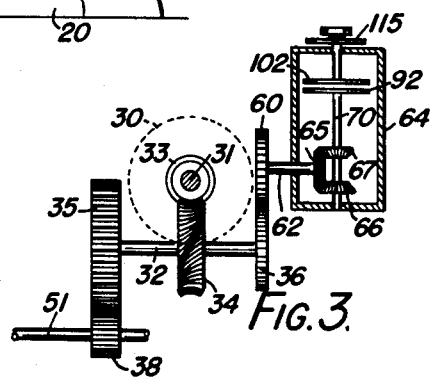
Fig. 3 is another fragmentary, more or less diagrammatic view, showing further details of the planer feed mechanism drive.

The tool feed is actuated by a motor 30 which is of the variable speed type. The armature shaft 31 (Fig. 2) of this motor drives a shaft 32 through a worm 33 and worm wheel 34. Mounted on the shaft 32 at one side axially of the worm wheel 34 is a spur gear 35. Mounted on the shaft 32 at the other side of the worm wheel 34 is a spur gear 36 (Fig. 3). The spur gear 35 meshes with and drives two pinions 37 and 38. These pinions are rotatably mounted on shafts 50 and 51, respectively. They are adapted to be selectively coupled to these shafts to drive the same by means of the clutches 52 and 53, respectively.

Shaft 51 is a screw shaft which threads into a nut 54 (Fig. 1) in the saddle 26, thereby to effect horizontal feed of the tool T. Shaft 50 drives through gearing (not shown) a vertical screw shaft (not shown) which engages a nut on the slide 27 that carries the tool T.

This slide is movable vertically to control depthwise feed of the tool into the work.

One or other of the clutches 52 and 53, which couple the pinions 37 and 38, respectively, to the shafts 50 and 51, respectively, is engaged manually at the start of operation of the machine depending upon whether the tool is to be fed depthwise or laterally between strokes of the work carriage. The drive from the motor 30 to the saddle 26 and to the slide 27 is conventional.

Figure 4:
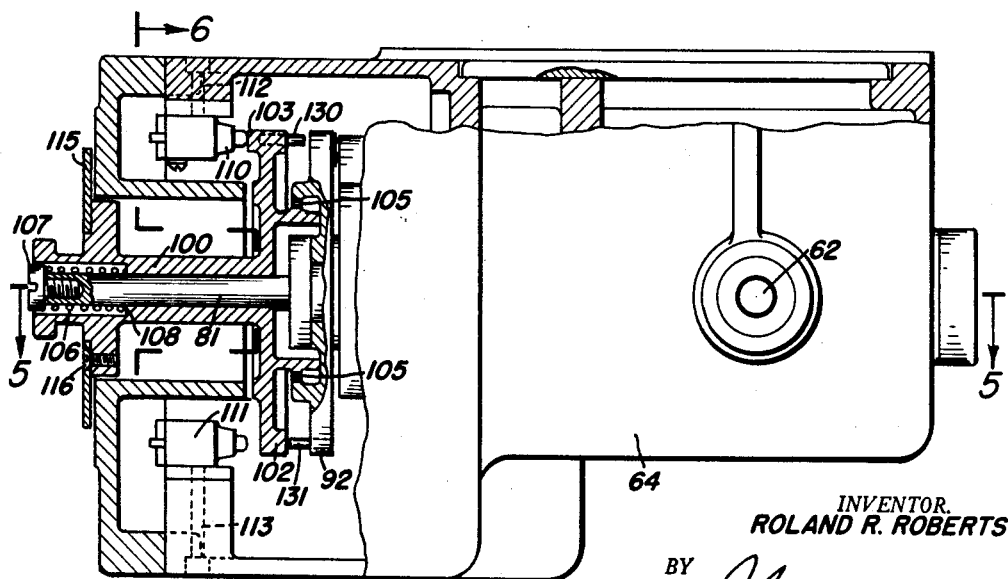
Fig. 4 is a side elevation, partially broken away, showing on an enlarged scale the control mechanism for the feed.

The gear 36 (Fig. 3) meshes with and drives a gear 60 which is fastened to one end of a shaft 62. This shaft is journaled in the control box 64 (Figs. 4, 5 and 6). It has a bevel gear 65 keyed to it which meshes with two coaxial, oppositely disposed, bevel miter gears 66 and 67, thereby driving these two gears in opposite directions. These two gears are connected by conventional one-way clutches 68 and 69 (Fig. 5), respectively, with a shaft 70. The shaft 70 is disposed at right angles to shaft 62, and is journaled adjacent opposite ends in suitable bearing members 71 and 72, which are secured by screws 73 and 74, respectively, in the housing 64.

Secured to the inner end of the shaft 70 by a set screw 75 is one member of a conventional magnetic clutch which is denoted as a whole at 80. Another member of this clutch is secured to the inner end of a shaft 81, which is axially aligned with the shaft 70.

Shaft 81 is journaled on bushings 83 in a bracket 84 which is fastened by bolts 85 in the housing 64. Shaft 81 has an enlarged head 90 intermediate its ends to which there is secured by screws 91 a disc or plate 92. This disc is connected by a pin 93 to the outer end of a spiral coil spring 95. The inner end of this spring is connected by a pin 96 to the bracket 84.

Rotatably mounted upon the shaft 81 is a sleeve 100 with which there is integral another disc 102. Disc 102 is coaxial with disc 92 and is formed on its outer face adjacent its periphery with an arcuate cam lobe 103 (Figs. 4, 5 and 6), that extends partway around its axis. This cam lobe has rise portions 101 and 104 at opposite ends.

The disc 102 is adjustable angularly relative to the disc 92 and is adapted to be coupled to the disc 92 in any adjusted position by a conventional toothed coupling 105 (Fig. 5), comprising an external toothed member on the disc 102 and an internal toothed member on the disc 92. This coupling is normally held in engagement by a coil spring 106 which is interposed between the head of a screw 107 and an internal shoulder 108 formed in the sleeve 100. The screw 107 threads into the shaft 81.

The disc 102 is adapted to be adjusted angularly so that the cam lobe 103 will actuate selectively one or both of the two conventional limit switches 110 and 111 (Figs. 6 and 4) which are secured by screws 112 and 113, respectively, in the housing 64. By rotating the cam disc 102, when it is uncoupled from disc 92, cam lobe 103 will be actuated to trip one or both of the limit switches 110 and 111. The raised portion of the cam lobe, when rotated, will depress the plunger of one or both of these limit switches depending on the angular position to which the cam lobe is rotated. The limit switches are connected with the feed motor 30 in conventional manner to control the rate of speed at which this motor runs. The switch 110, for instance, may be used to shift the motor to its low speed rate to decrease the r.p.m. of the motor 30, while the switch 111 may be used to shift the motor to its high speed rate to increase the r.p.m.

It is desirable to have the motor run at low speed in order to decrease the over-run of the motor due to armature inertia. This decreases the percentage of error in the number of revolutions of the motor in low feed. Where a relatively large amount of feed has to be achieved in the time interval allowed by overrun of the work carriage between working strokes, the motor must be run at high speed in order to attain the number of revolutions of the motor required to achieve the desired amount of feed. For this purpose cam lobe 103 is adjusted angularly, upon uncoupling of cam disc 102 from disc 92, to bring it into engagement first with the plunger of limit switch 111 to trip that limit switch.

The amount of feed is adjusted by use of a graduated disc 115 (Figs. 4, 5 and 7) which is fastened by screws 116 to the sleeve 100. Disc 115 may be graduated in fractions of an inch as shown in Fig. 7. The graduations of disc 115 read against a zero mark on the cover 117 of the control box housing. Cover 117 is secured to the housing by screws 119. By pulling the sleeve 100 outwardly with reference to the shaft 81 against the resistance of the spring 106, the coupling 105 can be disengaged. Then the sleeve 100 can be rotated to rotate the disc 102 relative to the disc 92, thereby to position the cam lobe 103 to operate either the limit switch 110 or both the limit switch 111 and the switch 110 successively.

The cam disc 102 has a lug 120 (Figs. 5 and 6) integral with it. This lug is adapted to engage a plunger 122 of a limit switch 123 that is mounted in housing 64. Limit switch 123 is operatively connected to magnetic clutch 80 and motor 30 to deenergize the clutch 80 and stop the motor 30, when the switch is tripped by lug 120.

Lug 120, therefore, determines the time that the feed motor 30 runs, that is, the number of revolutions which the feed motor makes in a cycle. In the position shown in Fig. 6, the controller is set for the maximum feed; the cam lobe 103 has been positioned, by uncoupling coupling 92 and rotating disc 102, so as to trip switch 111 first; and the lug 120 has been positioned at the furthest possible point angularly away from plunger 122. The direction of travel of the disc 102, when coupled to disc 92, is indicated by the arrow 118 in Fig. 6. In Fig. 5, disc 102 is shown adjusted to a different position where lug 120 is much closer to plunger 122 and will trip switch 110 but not switch 111. The disc 102 can be adjusted to any angle about the axis of the shaft 81 from zero to the position shown in Fig. 6 where lug 120 is 324° away from zero.

A master reverse switch 135 (Fig. 8) operated by a trip dog 150 on the carriage of the machine energizes the magnetic clutch 80 (Fig. 5) at the end of each return stroke of the carriage. At the same time, a master switch 136 (Fig. 8), also operated by a trip dog 151 (Fig. 9) on the carriage, starts the motor 30. If desired, the same switch might be used for both these purposes.

As soon as the motor 30 starts to run, screw shaft 51 is rotated to effect lateral feed of saddle 26 and tool T, if clutch 53 has been engaged, or to effect depthwise feed of slide 27 and tool T, if clutch 52 has been engaged. Simultaneously motor 30 drives cam disc 102. This drive is from the motor 30 through the gearing 33, 34, 36, 60, 65, and 66 or 67, depending upon the direction of rotation of motor 30, shaft 70, coupling 80, shaft 81, disc 92, and coupling 105. If the disc 102 has been adjusted to a position, such as shown in Fig. 6, where the limit switch 111 has been tripped, the variable speed motor 30 will operate at high speed as long as the cam lobe 103 is in engagement with the limit switch 111; then the limit switch 110 will be tripped by the cam lobe to slow the motor down again. If the disc 102 has been adjusted initially angularly relative to the disc 92 so that it will only actuate the limit switch 110, the motor 30 will revolve at low speed until stopped. Of course, the initial angular adjusted position of the disc 102 determines when the lug 120 comes into operation. This will determine the number of revolutions which the motor 30 makes before it is stopped; and this determines the amount of feed of the tool in the feed cycle.

The operation of the motor 30 and of the feed shaft 50 or 51 continues until the lug 120 strikes the plunger 122 of the limit switch 123. This trips this limit switch and deenergizes the magnetic clutch 80, stopping the cam disc 102 and motor 30. This occurs before the carriage 22 on its reverse stroke has brought the work to a position to be engaged by the tool. In other words, the carriage overtravels a sufficient distance to permit the tool to be fed depthwise toward the work or laterally relative to the work by the amount of the chip which it is desired to remove from the work during each working stroke, before the tool actually engages the work on the working stroke.

Since the disc 102 is adjustable angularly to different positions, the amount of travel of the disc before the lug 120 strikes the plunger 122 of the limit switch 123 is variable.

When the magnetic clutch 80 is deenergized the spiral spring 95, which is wound during rotation of the shaft 81 in the housing, returns the discs 92 and 102 to their starting positions. There is a lug 125 on disc 92. Engagement of this lug with a bumper, which is mounted in a bolck 126 (Fig. 6), that is secured by screws 127 to the housing 64, cushions the return movement of the disc. This bumper includes the coil spring 128.

A pin 130 on the disc 102, which is positioned to engage with a pin 131 on the disc 92, determines the maximum angular starting position to which the disc 102 may be set away from zero.

Figure 8:
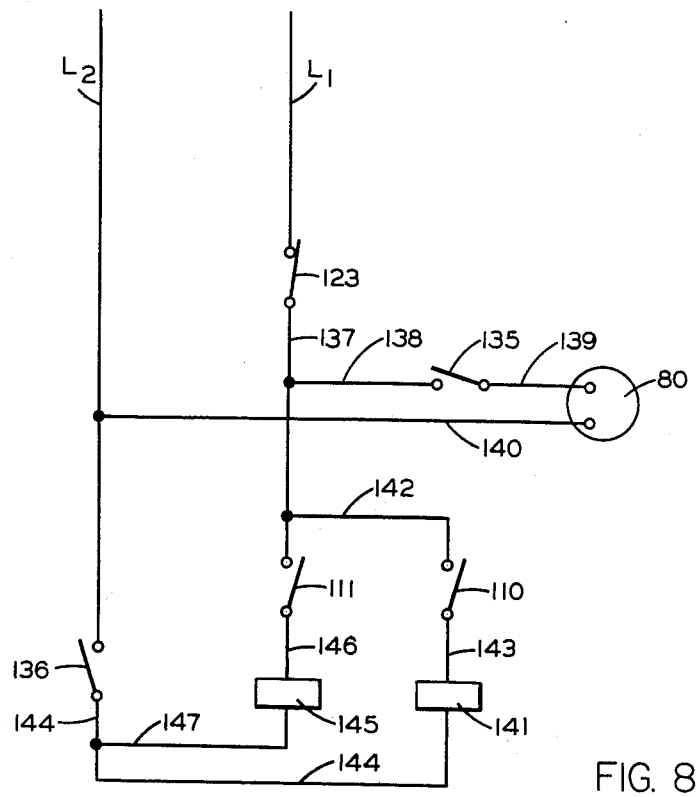
Fig. 8 is an electrical diagram showing how the feed control mechanism may be wired to achieve its purpose.
Figure 9:
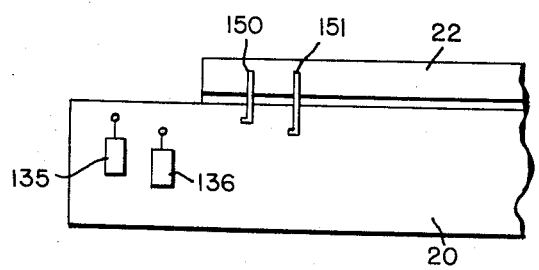
Fig. 9 is a fragmentary side elevation of the carriage of the machine showing the trip dogs for tripping the master switch and the master reverse switch, and showing, also, these switches.

Fig. 8 shows one way in which the control mechanism may be wired to accomplish its purpose. $L_1$ and $L_2$ are the main lines. When switches 135 and 136 are closed by trip dogs on the carriage 22, circuits are closed to the magnetic clutch 80 and to the variable speed motor 30. The circuit to the clutch 80 is from the main line $L_1$ through the normally closed switch 123, the lines 137 and 138, the now-closed switch 135, the line 139, the clutch 80, and the line 140 back to the main line $L_2$. The circuit to the motor depends initially upon the initial position of adjustment of the member 102. If the control member 102 is adjusted so that it closes the switch 110, the circuit is from the main line $L_1$ through the switch 123, the lines 137 and 142, the now-closed switch 110, the line 143, the controller 141 which controls the low speed winding of the motor, the line 144, the now-closed switch 136 to the main line $L_2$. If the control member 102 has been adjusted initially far enough away from stopping position to close the switch 111, then the circuit to the motor is through that switch, the line 146, the controller 145 which controls the high speed winding of the motor, the lines 147 and 144, the now-closed switch 136 to the main line $L_2$. When the high portion of the cam lobe 103 passes beyond the plunger of the limit switch 111, the switch 111 will be opened; and the high speed operation of the motor 30 will stop, but the switch 110 will be closed to cause the motor 30 to operate at low speed until it is stopped by opening the switch 123.

As will be obvious from the preceding description, in the device of the present invention, the feed mechanism is operated by a variable speed motor. The length of time that the motor runs, that is the number of revolutions which it makes, in a feed cycle is controlled by the position to which lug 120 is adjusted in adjustment of cam disc 102. The speed of the motor is controlled also by the position to which the disc 102 is adjusted, through the microswitches 110 and 111 and the cam 103. However, the disc 102 can be adjusted through an angle of approximately 180° before shifting from high to low speed operation of the motor and vice versa. The direction of rotation of the motor is changed for lateral feed in the required direction when cutting opposite sides, respectively, of a workpiece. However, the cam disc 102 is driven in the same direction regardless of the direction of rotation of the motor.

While the invention has been described in connection with a machine in which the work carriage is reciprocable with reference to the tool, it will be understood that it is usable also in a machine where the work is stationary and the tool travels relative to the work in the cutting stroke. Moreover, the invention is not limited to planers, but may be used on slotters, surface grinders and other types of machine tools.

While the invention has been described, therefore, in connection with a specific embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a feed mechanism the combination with a variable speed motor, of means for controlling the number of revolutions of said motor in a feed cycle, comprising a housing, a shaft journaled in said housing, a rotary control member journaled in said housing and having a cam portion of less angular extent than the angular extent of said control member, means for coupling said control member to said shaft to drive said control member from said shaft, means for driving said shaft from said motor, a trip member carried by said control member and operative on rotation of said control member for disconnecting the first-named coupling means and for stopping said motor, a pair of switches operative, respectively, when closed, to effect, respectively, different speeds of operation of said motor, said switches being positioned in angularly spaced relation about the axis of said control member to be actuated by its cam portion when engaged thereby, said control member being adjustable manually about its axis of rotation when uncoupled from said shaft to position said trip member and said cam portion at a predetermined position relative to motor-stopping position, and a spiral coil spring secured at one end to said housing and connected at its other end to said control member for returning said control member to its initial adjusted position upon disconnection of said last-named coupling means.

2. In a feed mechanism, the combination with a variable speed motor operable at both high speed and low speed, of means for controlling the number of revolutions of said motor in a feed cycle, comprising a first shaft, a rotary control member, means for coupling said control member to said first shaft so that said control member rotates on rotation of said shaft, a second shaft, means for driving said second shaft in a constant direction regardless of the direction of rotation of said motor, electro-magnetically-operated means for coupling said first shaft to said second shaft to drive said first shaft from said second shaft, an electrical limit switch operatively connected to the last-named coupling means and to said motor, and trip means actuated on rotation of said control member to a predetermined position to trip said switch to deenergize said last-named coupling means and disconnect said first shaft from said second shaft and stop said motor, a pair of switches operative, respectively, to effect, respectively, high speed and low speed operation of said motor, said control member having a face cam portion on one end face and being movable axially to uncouple it from said shaft, said switches being positioned in angularly spaced relation about the axis of said control member to be closed when engaged by said cam portion, said control member being adjustable manually about its axis of rotation when uncoupled from said shaft to position said trip means at a predetermined distance from motor-stopping position and to position said face cam portion for actuation selectively of one or both of the two switches.

3. In a feed mechanism, the combination with a variable speed motor, of means for controlling the number of revolutions of said motor in a feed cycle, comprising a housing, a shaft journaled in said housing, a rotary disc coaxial with said shaft, electromagnetically-operated means for coupling said disc to said shaft to drive said disc from said shaft, a spiral coil spring connected at one end to said housing and at its opposite end to said disc to be wound on rotation of said disc, a cam disc journaled in said housing in axial alignment with the first-named disc, means for coupling said cam disc to said first-named disc to rotate said cam disc on rotation of said first-named disc, means comprising a bevel gear, two opposed miter gears meshing with said bevel gear, and a pair of one-way clutches for driving said shaft in one direction from said motor regardless of the direction of rotation of said motor, a switch operatively connected to said electromagnetically-operated coupling means and to said motor to deenergize said electromagnetically operated coupling means and to stop said motor upon being tripped, trip means carried by said cam disc for tripping said switch upon rotation of said cam disc through a predetermined angle, a pair of switches operative, when closed, to effect, respectively, different speeds of operation of said motor, said cam disc having a cam portion extending part-way only around one of its side faces, the two switches of said pair of switches being positioned to be closed upon engagement therewith of said cam portion, the last-named coupling means being disconnectable by axial movement of said cam disc to permit manual rotative adjustment of said cam disc relative to said first-named disc to position said trip means at a predetermined distance from tripping position, and to bring said cam portion into position to engage one or both of the switches of said pair of switches upon the rotation of said cam disc.

4. In a machine tool having a work support, a tool support, and a tool carried by said tool support, one of said supports being reciprocable relative to the other through a distance sufficient to effect machining of the work by the tool and overtravel of the work relative to the tool, means for effecting feed of the tool periodically relative to the work during the overtravel comprising a variable speed motor, a rotary control member, said control member having a cam portion thereon whose angular extent is less than the angular extent of said control member, means for coupling said control member to said motor to drive said control member from said motor during operation of said motor, switches spaced angularly about said control member, and adapted to effect, respectively, relatively high speed and relatively low speed operation of said motor, said control member being disposed to trip said switches upon engagement of its cam portion therewith, said control member being adjustable about its axis of rotation, when uncoupled from said motor, to initially position the cam portion of said control member relative to said switches, means constantly biasing said control member to return to its adjusted position, means actuated by the reciprocable support during overtravel for starting said motor and coupling said coupling means, and means actuated by said control member for stopping said motor after a predetermined feed and coupling said coupling means to permit said control member to be reset to its initial adjusted position.

5. In a feed mechanism, the combination with a variable speed motor, of means for controlling the number of revolutions of said motor in a feed cycle comprising a shaft, a rotary control member having a cam portion thereon of less angular extent than said control member itself, means for coupling said control member to said shaft to drive said control member on rotation of said shaft, means for driving said shaft from said motor, and means carried by said control member and operable at a predetermined point in its rotation to uncouple said control member from said shaft and to stop said motor, said control member being rotatably adjustable relative to said shaft to initially position the last-named means at a selected angular distance away from said predetermined point, and a pair of limit switches disposed at different angular positions about the axis of said control member so that one or both of said switches is or are operated by said cam portion when engaged thereby in the rotation of said control member depending upon the initial adjusted position of said control member, said limit switches being operatively connected to said motor to effect, respectively, relatively high and relatively low speed operation of said motor, and means for returning said control member to initial adjusted position when it is uncoupled from said shaft.

References Cited in the file of this patent
UNITED STATES PATENTS

| | | |
|---|---|---|
| 771,373 | Langen | Oct. 4, 1904 |
| 894,232 | Richards | July 28, 1908 |
| 1,008,593 | Fish | Nov. 14, 1911 |
| 1,560,653 | Blood et al. | Nov. 10, 1925 |
| 1,678,302 | Randolph | July 24, 1928 |
| 2,405,686 | Clark | Aug. 13, 1946 |
| 2,469,594 | Danforth | May 10, 1949 |
| 2,521,801 | Mozzanini et al. | Sept. 12, 1950 |
| 2,575,792 | Bullard et al. | Nov. 20, 1951 |
| 2,594,782 | Makant et al. | Apr. 29, 1952 |